United States Patent Office 3,013,073
Patented Dec. 12, 1961

3,013,073
ARYL, DIALKYL-UREIDES AND MANNER OF PREPARATION
Marshall D. Draper, Woodland Hills, and Francis J. Petracek, Canoga Park, Calif., assignors to Riker Laboratories, Inc., Northridge, Calif., a corporation of Delaware
No Drawing. Filed June 15, 1959, Ser. No. 820,140
9 Claims. (Cl. 260—553)

This invention relates to compositions of matter known in the art of chemistry as substituted ureides and to novel intermediates and processes for making such compositions.

The invention

The invention, in its composition aspect, is described as residing in the concept of a chemical compound having a molecular structure in which there is attached, to the 1-position nitrogen atom of a 3,3-di-lower-alkyl urea, a lower-alkoxy-substituted benzoyl moiety or a lower-alkoxy-substituted cinnamoyl moiety through the carbonyl radical thereof. In its process aspect the invention is described as residing in the concept of acylating a 3,3-di-lower-alkyl urea or an alkali metal derivative thereof with the aforesaid benzoyl or cinnamoyl moiety in their acid, acid anhydride, acid halide, ester, or like acylating forms.

Definitions

As herein used, the term "lower-alkyl" means radicals of the empirical formula $-C_nH_{2n+1}$ wherein "$n$" is an integer from one to four, among which are, for purposes of illustration, the methyl-, ethyl-, isopropyl-, and tertiarybutyl-radicals.

As herein used, the term "lower-alkoxy" means radicals of the empirical formula $-OC_nH_{2n+1}$ wherein "$n$" is an integer from one to two, among which are, for purposes of illustration, the methoxy-, and ethoxy-radicals.

The physical embodiments of the invention are weakly acidic, white, crystalline solids, soluble in chloroform and aqueous sodium hydroxide, but insoluble in aqueous sodium bicarbonate. Data obtained by both infra-red and ultra-violet spectrophotometry confirm the ureide structure. The embodiments possess the inherent applied use characteristics of exerting a sedative-hypnotic effect in animal organisms as evidenced by pharmacological evaluation in dogs according to standard test procedures.

The novel substituted ureides may be used in the form of salts with non-toxic metals such as sodium or potassium.

The manner and process of making and using the invention will now be generally described so as to enable any person skilled in the art of chemistry to make and use the same, as follows:

The di-lower-alkyl urea starting materials may be prepared according to the procedure described in Berichte 44 (1911), 3165. The mono-, di-, and tri-lower-alkoxy benzoyl and equivalent cinnamoyl moieties, having the lower-alkoxy radicals in a wide variety of positions on the ring, are known in the form of their acid anhydrides, acid halides, and alkyl esters of the acids. Any of these forms are useful as acylating agents for reaction with the starting ureas.

In conducting the acylation reaction, the substituted urea is dissolved in a volatilizable anhydrous solvent inert under the conditions of the reaction, such as liquid ammonia, acetone, or benzene. The sodium salt of the substituted urea is then formed by adding a stoichiometric amount of sodium, sodium methoxide or sodium hydride.

When sodium is used in liquid ammonia the sodium metal is added to the solution in an amount such that the solution becomes colorless, a blue color indicating the presence of sodium which has not formed the desired urea salt. Thereafter about a stoichiometric amount of the acylating agent is added slowly to the reaction mixture. The solvent is then evaporated, water is added to the reaction vessel while stirring, and the reaction product is acidified to about pH 5 with an acid, such as glacial acetic or hydrochloric acid. In this manner the desired ureide product is obtained as an off-white solid, which upon the addition of water and cooling below about 0° degrees centigrade, can be recovered by filtration. The product can be purified by recrystallization and drying.

Other equivalent methods of producing the desired ureides can be employed. Thus, the acyl urea may first be made from urea and the acyl chloride, followed by alkylating the acyl urea as by converting it to the nitrourea by treatment with nitric acid, dehydrating the product with concentrated sulfuric acid, and then treating this product with a di-lower-alkylamine to give the desired ureide. In still another procedural modification, the desired ureide can be prepared by acylating a di-lower-alkyl-pseudo-urea, followed by hydrolysis of the acyl di-lower-alkyl-pseudo-urea.

The best mode contemplated by the inventor of carrying out his invention will now be set forth, as follows:

Dissolve 16 grams (0.14 mole) of 3,3-diethylurea with stirring in 350 milliliters of liquid ammonia in a reaction vessel provided with a stirrer. Add 3 grams of sodium metal freshly cut in small pieces. Add 29 grams (0.12 mole) of 3,4,5 tri-methoxy benzoic acid ethyl ester at a substantially uniform rate over a period of 5 minutes. Let the reaction mixture stand overnight until evaporated to dryness. Add about 100 milliliters of water with stirring and acidify to about pH 5 with glacial acetic acid. A creamy-white solid separates which, after addition of about 100 milliliters of water and cooling to about 0 degrees centigrade, is recovered by filtration. Dissolve the solid in chloroform and dry with anhydrous sodium sulfate. Evaporate the chloroform and triturate with ether to produce 15 grams of white prisms, being 1-(3′,4′,5′-trimethoxybenzoyl)-3,3-diethyl urea, melting at 122 degrees centigrade. The product was dissolved in propylene glycol, sterilized, and administered intraperitoneally to unanaesthetised dogs at a dosage of 100 milligrams per kilogram of body weight. A gentle induction of sleep occurred within 10 minutes, the sleep lasting 30 to 40 minutes. A drowsy and unconcerned state persisted for an additional 60 to 90 minutes. Given orally in the same dosage it caused marked sedation in 30 minutes followed by prolonged light sleep from which the dog could be aroused by sounds at a loudness above about 55 decibels.

Other benzoyl ureides and the corresponding cinnamoyl compounds can be prepared in the manner described by substituting the stoichiometric equivalent of a lower-alkoxy benzoyl or cinnamoyl acid lower-alkyl ester for the benzoic acid ester acylating agent employed as in the example specifically illustrating the best mode of carrying out the invention or by the equivalent procedures hereinbefore described.

The acyl di-lower-alkyl pseudo-ureas are novel compounds and to facilitate their use as intermediates in making the ureides herein disclosed and claimed the mode of making such intermediates will now be illustrated.

Thus a 2-O-methyl-3,3-dialkyl pseudo-urea is dissolved in a suitable solvent such as benzene, cooled and reacted with a stoichiometric amount of the acylating agent. The reaction mixture is washed with water and the solvent removed by distillation.

Specifically 1-(3′,4′,5′-trimethoxybenzoyl) 2-O-methyl-3,3-diethyl pseudo-urea may be prepared as follows:

Dissolve 4 grams of 2-O-methyl pseudo-urea in 50 milliliters of benzene and cool to 2° centigrade. Add 6.8 grams of 3,4,5-tri-methoxybenzoyl chloride dissolved in 50 milliliters of benzene and cooled to 2° centigrade. The temperature rises to about 16° centigrade. Allow the reaction mixture to stand at room temperature for one hour. Wash with two portions of water. Dry the benzene layer over anhydrous sodium sulfate and distill off the benzene to produce a yellow oil.

Other 1 - (lower - alkoxybenzoyl) - 3,3 - dialkyl-, or 1-(lower-alkoxycinnamoyl)-3,3-dialkyl-2-O-methyl pseudo-ureas may be prepared in the same manner by using the corresponding acylating agents as starting materials.

The following example is illustrative of the manner of hydrolysing the acylated pseudo-ureas of this invention to the corresponding acylated ureas:

Heat 4 grams of 1-(3',4',5'-trimethoxybenzoyl 2-O-methyl-3,3-diethyl pseudo-urea with 36 milliliters of 12 Normal hydrochloric acid on a steam bath for 5 minutes. Cool the reaction mixture and place in the refrigerator for about 1 hour. Filter the precipitate, wash with cold water and recrystallise from hot water to produce white prisms melting at 123° centigrade. Yield 50%.

We claim:
1. 1-(lower-alkoxy-benzoyl)-3,3-di-lower-alkyl urea.
2. 1-(lower-alkoxy-cinnamoyl)-3,3-di-lower-alkyl urea.
3. 1 - (lower - alkoxy - benzoyl)-3,3-di-lower-alkyl-2-O-methyl pseudo-urea.
4. 1 - (lower - alkoxy - cinnamoyl) - 3,3-di-lower-alkyl-2-O-methyl pseudo-urea.
5. 1-(3',4',5'-trimethoxybenzoyl)-3,3-diethyl urea.
6. 1 - (3',4',5' - trimethoxybenzoyl - 2 - O - methyl-3,3-diethyl pseudo-urea.
7. The process of acylating the 1-position nitrogen of a 3,3-di-lower-alkyl urea which comprises dissolving said 3,3-di-lower-alkyl urea in a volatilisable anhydrous solvent, adding about a stoichiometric amount of an alkali-salt-forming reagent selected from the group consisting of an alkali metal, an alkali methoxide and an alkali hydride to form the alkali metal salt of said 3,3-di-lower-alkyl urea, adding about a stoichiometric amount of an acylating agent selected from the group consisting of lower alkoxy-benzoic and lower alkoxy-cinnamoic acids, their acid halides, acid anhydrides and alkyl esters, evaporating the solvent, and acidifying the reaction product and recovering a 1-acylated 3,3-di-lower-alkyl urea.

8. The process of acylating the 1-position nitrogen of a 3,3-di-lower-alkyl pseudo urea which comprises dissolving a 2-O-methyl-3,3-dialkyl pseudo urea in a volatilisable anhydrous solvent, adding about a stoichiometric amount of an acylating agent selected from the group consisting of lower alkoxy-benzoic and lower alkoxy-cinnamoic acids, their acid halides, acid anhydrides, and alkyl esters, evaporating the solvent and recovering a 1-acylated 2-O-methyl-3,3-dialkyl pseudo urea.

9. The process according to claim 8 wherein the 1-acylated 2-O-methyl-3,3-dialkyl pseudo urea is hydrolysed to the 1-acylated 3,3-dialkyl urea.

References Cited in the file of this patent
UNITED STATES PATENTS
2,090,593    Jacobson _____ Aug. 17, 1937

OTHER REFERENCES
Foust et al., J. Am. Pharm. Assoc., vol. 45, pages 514–517 (1956).